United States Patent
Qiu et al.

(10) Patent No.: US 9,335,023 B2
(45) Date of Patent: May 10, 2016

(54) QUANTUM DOT LENS AND MANUFACTURING METHOD THEREOF

(71) Applicant: SHENZHEN CHINA STAR OPTOELECTRONICS TECHNOLOGY CO., LTD., Shenzhen, Guangdong (CN)

(72) Inventors: Yongyuan Qiu, Guangdong (CN); Chi Tsung Kang, Guangdong (CN); Sheng Jer Chang Chien, Guangdong (CN); Zanjia Su, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 254 days.

(21) Appl. No.: 14/235,787

(22) PCT Filed: Dec. 31, 2013

(86) PCT No.: PCT/CN2013/091093
§ 371 (c)(1),
(2) Date: Jan. 28, 2014

(87) PCT Pub. No.: WO2015/085639
PCT Pub. Date: Jun. 18, 2015

(65) Prior Publication Data
US 2015/0159833 A1   Jun. 11, 2015

(30) Foreign Application Priority Data
Dec. 11, 2013   (CN) .......................... 2013 1 0676041

(51) Int. Cl.
*F21V 3/00*       (2015.01)
*F21V 5/00*       (2015.01)
(Continued)

(52) U.S. Cl.
CPC ............ *F21V 5/04* (2013.01); *B29D 11/00355* (2013.01); *G02B 3/00* (2013.01); *F21Y 2101/02* (2013.01); *Y10S 977/834* (2013.01)

(58) Field of Classification Search
CPC ...... F21V 5/04; B29D 11/00355; G02B 3/00; Y10S 977/834; F21Y 2101/02
USPC ...................... 313/502, 503; 257/98, 99, 100; 362/311.01, 260
See application file for complete search history.

(56) References Cited

U.S. PATENT DOCUMENTS

| | | | | |
|---|---|---|---|---|
| 6,501,091 | B1 * | 12/2002 | Bawendi ................ | B82Y 10/00 257/100 |
| 2002/0180351 | A1 * | 12/2002 | McNulty ................ | B82Y 20/00 313/512 |

(Continued)

FOREIGN PATENT DOCUMENTS

JP   WO 2012102107 A1 *   8/2012   ............ H01L 23/564

*Primary Examiner* — Elmito Breval
*Assistant Examiner* — Glenn Zimmerman (57) ABSTRACT

The present application relates to a quantum dot lens and a manufacturing method thereof, wherein the quantum dot comprises a lens body in the form of a rotator, a light incident surface and a light exit surface are formed on the lens body, the centers of the light incident surface and the light exit surface are located in the center axis of the lens body; and quantum dot materials are filled inside the lens body. The quantum dot lens can be used with a single LED. Since the light excited from the quantum dot materials can directly meet the need of increasing the light emitting angle, the quantum dot lens has no need to be used with a second lens for light distribution; the quality of the backlight used in the backlight illumination can be improved; and the high gamut in the direct type backlight can be achieved.

4 Claims, 5 Drawing Sheets

(51) Int. Cl.
*F21V 5/04* (2006.01)
*B29D 11/00* (2006.01)
*G02B 3/00* (2006.01)
*F21Y 101/02* (2006.01)

(56) References Cited

U.S. PATENT DOCUMENTS

2004/0150991 A1* 8/2004 Ouderkirk ............... H01L 33/46
   362/231
2007/0012873 A1* 1/2007 Miyano ................. B82Y 35/00
   350/234
2008/0191232 A1* 8/2008 Lee .......................... H01L 33/58
   257/98
2009/0115313 A1* 5/2009 Lu .......................... H01L 33/505
   313/503
2010/0149815 A1* 6/2010 Erchak ...................... F21S 2/00
   362/293
2010/0308356 A1* 12/2010 Wirth ....................... H01L 33/54
   257/98
2011/0114979 A1* 5/2011 Jang ......................... H01L 33/486
   257/98
2013/0049049 A1* 2/2013 Choi ........................ H01L 33/486
   257/98
2013/0334557 A1* 12/2013 Uchida .................... H01L 23/564
   257/98

* cited by examiner

Controlling a mould and injection molding the silicone into a lens body; wherein the lens Body is in the form of a rotator, a light incident surface and a light exit surface are formed on the lens body, the centers of the light incident surface And the Light exit surface are located in the center axis of the lens body; and a filling cavity is formed at the bottom of the rotator;

filling the filling cavity with quantum dot materials

Fig. 11 controlling a mould and injection molding quantum dot materials into predetermined shapes;

encapsulating the quantum dot materials with silicone to form a lens body; wherein the lens body is in the form of a rotator, a light incident surface and a light exit surface are formed on the lens body, the centers of the light incident surface and the light exit surface are located in the center axis of the lens body; and a filling cavity is formed at the bottom of the rotator.

Fig. 12

QUANTUM DOT LENS AND MANUFACTURING METHOD THEREOF

FIELD OF THE INVENTION

The present invention relates to backlight illumination technology, and more particularly, relates to a quantum dot lens used with a single LED and the manufacturing method thereof.

BACKGROUND OF THE INVENTION

Quantum Dot (QD) can also be called as nanocrystal, and is a nano-particle consisting of Groups II-VI elements or Groups III-V elements. Quantum dots with different emission spectrums can be manufactured by controlling the dimensions of the quantum dots, since the band gaps of the quantum dots are inversely proportional to the dimensions thereof. In addition, the half peak width of the emission spectrum of the quantum dot (approximately 50-60 nm) is narrower than the half peak width of the green phosphor (approximately 80 nm) or the half peak width of the red phosphor (approximately 100 nm); wherein the green phosphor and the red phosphor here are common used in LED at present. Making use of the two characters above, when the quantum dot is applied to television, it can be well used with color filter (CF); in this way, a high transmittance can be achieved and a high gamut (NTSC) can be ensured.

At present, quantum dot materials in the market mainly include CdSe which forms the core of a quantum dot, and CdS which forms the shell of the quantum dot. High temperature and oxygen may lead to an invalidation of the quantum dot materials. Therefore, the quantum dots in the market should have their materials protected. The protection methods can be classified into two types. One is the quantum dot film (QD-film), that is, the quantum dot materials are encapsulated by PET. The other method is the quantum dot rail (QD-rail), that is, the quantum dot materials are encapsulated within a hollow glass tube. The quantum dot film needs larger number of materials; while a great number of quantum dot rails are needed if the backlight in the display field using the quantum dot, since the light emitting angle of the quantum dot rail is limited. These two methods are not cost-effective.

SUMMARY OF THE INVENTION

To overcome the drawbacks that the quantum dot rail has a small light emitting angle and a great number of quantum dot materials are needed to meet the need when using the quantum dots for the backlight illumination in the prior art; the objective of the present invention is to provide a quantum dot lens which can be used with a single LED to solve the problems above.

In accordance with one aspect of the present application, a quantum dot lens is provided, wherein the quantum dot lens comprises a lens body in the shape of a rotator, a light incident surface and a light exit surface are formed on the lens body, the centers of the light incident surface and the light exit surface are located in the center axis of the lens body; and quantum dot materials are filled inside the lens body.

In one embodiment, the light incident surface is a plane; and the light exit surface is in the shape of a hemisphere or a semi-ellipse.

In another embodiment, a conical diffusion hole is defined in the lens body; the diffusion hole is located in the center of the light exit surface, and is configured to increase the light emitting angle; the diameter of the diffusion hole expands gradually from the interior of the lens body to the exterior.

In a further embodiment, the light exit surface is in the shape of a bispherical butterfly.

In another further embodiment, the light exit surface is a plane, and a conical diffusion hole is defined in the lens body; the diffusion hole is located in the center of the light exit surface, and is configured to increase the light emitting angle; the diameter of the diffusion hole expands gradually from the interior of the lens body to the exterior.

In a further embodiment, the lens body includes an encapsulating tube made from glass; a filling cavity is formed inside the encapsulating tube, wherein the shape of the filling cavity matches with the shape of the rotator, and the quantum dot materials are filled into the filling cavity.

In a further embodiment, the lens body includes a filling cavity located at the bottom of the rotator and a silicone layer in which the filling cavity is encapsulated in; the quantum dot materials are filled into the filling cavity.

In accordance with another aspect of the present application, a manufacturing method for a quantum dot lens, comprising the following steps:
controlling a mould and injection molding the silicone into a lens body; wherein the lens body is in the form of a rotator, a light incident surface and a light exit surface are formed on the lens body, the centers of the light incident surface and the light exit surface are located in the center axis of the lens body; and a filling cavity is formed at the bottom of the rotator; and
filling the filling cavity with quantum dot materials.

In one embodiment, the light exit surface is in the shape of a hemisphere or a semi-ellipse.

In another embodiment, a conical diffusion hole is defined in the lens body; the diffusion hole is located in the center of the light exit surface, and is configured to increase the light emitting angle; the diameter of the diffusion hole expands gradually from the interior of the lens body to the exterior.

In a further embodiment, the light exit surface is in the shape of a bispherical butterfly.

In another further embodiment, the light exit surface is a plane, and a conical diffusion hole is defined in the center of the light exit surface; the diameter of the diffusion hole expands gradually from the interior of the lens body to the exterior.

In accordance with a further aspect of the present application, a manufacturing method for a quantum dot lens, comprising the following steps:
controlling a mould and injection molding quantum dot materials into predetermined shape;
encapsulating the quantum dot materials with silicone to form a lens body; wherein the lens body is in the form of a rotator, a light incident surface and a light exit surface are formed on the lens body, the centers of the light incident surface and the light exit surface are located in the center axis of the lens body; and the quantum dot materials is at the bottom of the lens body.

In one embodiment, the light exit surface is in the shape of a hemisphere or a semi-ellipse.

In another embodiment, a conical diffusion hole is defined in the lens body; the diffusion hole is located in the center of the light exit surface, and is configured to increase the light emitting angle; the diameter of the diffusion hole expands gradually from the interior of the lens body to the exterior.

In a further embodiment, the light exit surface is in the shape of a bispherical butterfly.

In another further embodiment, the light exit surface is a plane, and a conical diffusion hole is defined in the center of the light exit surface; the diameter of the diffusion hole expands gradually from the interior of the lens body to the exterior.

When implementing the quantum dot lens and the manufacturing method thereof of the present invention, the following advantageous effects can be achieved: the quantum dot lens can be used with a single LED; the quantum dot lens is formed by controlling the quantum dots, as a result of which the light emitting angle is increased, the use of the quantum dot materials then can be reduced, and the cost can also be reduced. Since the light excited from the quantum dot materials can directly meet the need of increasing the light emitting angle, the quantum dot lens has no need to be used with a second lens for light distribution; in this way, the quality of the backlight used in the backlight illumination can be improved; and the high gamut in the direct type backlight can be achieved.

BRIEF DESCRIPTION OF THE DRAWINGS

The present invention will be further described with reference to the accompanying drawings in the following, in the accompanying drawings.

DETAILED DESCRIPTION OF THE PREFERRED EMBODIMENT

The present invention will now be described in detail with reference to the accompanying drawings and embodiments.

Figure 1:
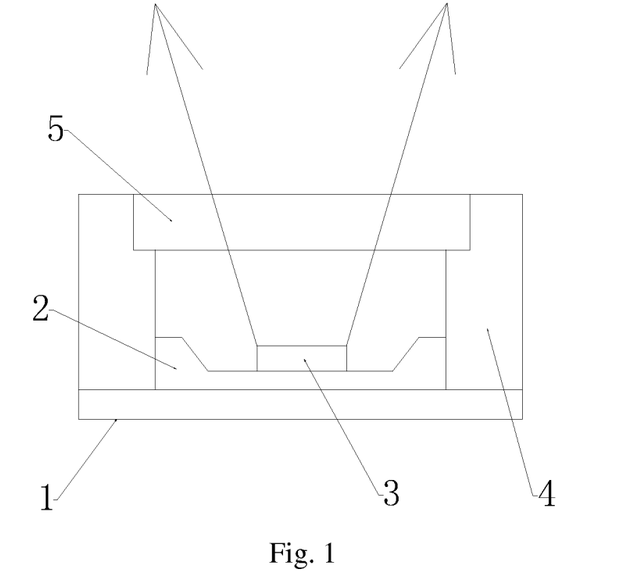
FIG. 1 is a schematic structure view that illustrates a quantum dot rail assembled with LED in the prior art.

FIG. 1 is a side view of the configuration in which a LED is used with a quantum dot to display in the prior art. In the prior art, a mixing cup 4 is formed by extending upward from one surface of an aluminum substrate 1. A cavity configured to carry a blue LED 2 and a chip 3 is formed in the middle of the mixing cup 4. A quantum dot rail 5 of a cuboid shape is deposited on the top of the cavity. When current passes through the chip 3, the blue LED 2 is excited to emit blue light, and the quantum dot rail 5 is excited by the blue light to emit a light, of which the wavelength corresponds to the dimension of the quantum dot material inside the quantum dot rail 5.

Figure 2:
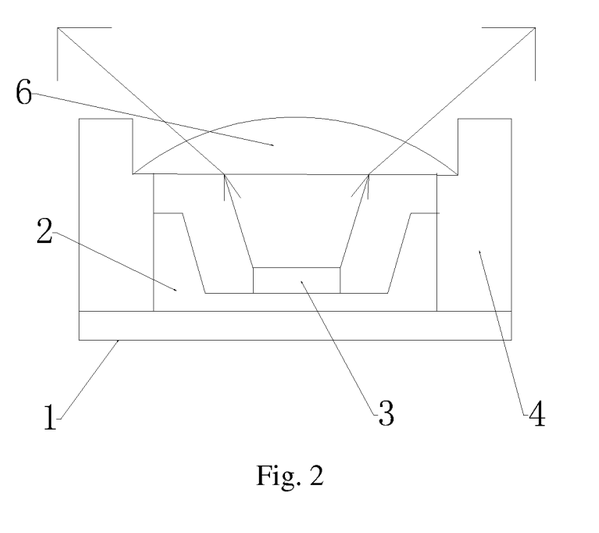
FIG. 2 is a view that illustrates a first embodiment of a quantum dot lens assembled together with LED according to the present application.
Figure 3:
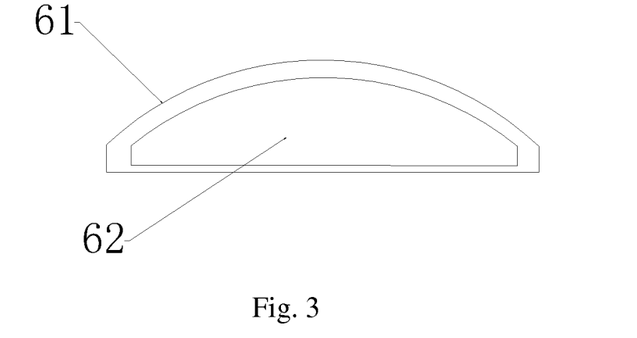
FIG. 3 is a view that illustrates the quantum dot lens as shown in FIG. 2.

Limited by the dimension of the LED, the light emitting angle of the LED in FIG. 1 is small, which reaches to approximately 120°. If the LED shown in FIG. 1 is used in backlight emitting, more LEDs are needed to produce sufficient light emission area; in this way, more quantum dot materials are consumed and the cost is high. For this, a quantum dot lens used with a single LED as shown in FIG. 2 is provided in the present application, to increase the light emitting angle of the exiting light, and reduce the number of LEDs, in this way, the manufacturing cost is reduced. In this embodiment, the existing quantum dot rail 5 is replaced by a quantum dot lens 6. The lens body of the quantum dot lens 6 is a rotator, and the bottom surface of the rotator is a planar light incident surface. The light exit surface is a diffusion exit surface in the form of a hemisphere or a semiellipse, and the center axis of the rotator passes the center of the light incident surface and the center of the light exit surface. The quantum dot lens 6 is filled with quantum dot materials. In this embodiment, the structure of the quantum dot lens 6 is shown in FIG. 3. The exterior shell of the quantum dot lens 6 is a thin glass tube 61 configured to encapsulate the quantum dot materials; and the interior of the quantum dot lens 6 is a filling cavity 62 which matches with the shape of the quantum dot lens 6, and the filling cavity 62 is configured to be filled with quantum dot materials. In this embodiment, the quantum dot materials filled in the filling cavity 62 is a semiconductor material, of which the refractive index is about 2.45. This quantum dot material is firstly dissolved into the methyl alcohol of which the refractive index is 1.328 or the hexane of which the refractive index is 1.375, to form a liquid form. After that, the mixed liquid is then filled into the filling cavity 62, and the quantum dot lens 6 is thus formed. As a result of the difference among the refractive indexes of the materials, after the light emitted from the LED passing the flat incident surface and the spherical or ellipsoid diffusion exit surface, the increase of the light emitting angle can be achieved, which is particularly suitable for the direct type backlight unit (BLU), the uniform brightness distribution of the BLU can be ensured, and the number of the LEDs and quantum dot lenses needed can be reduced.

Figure 4:
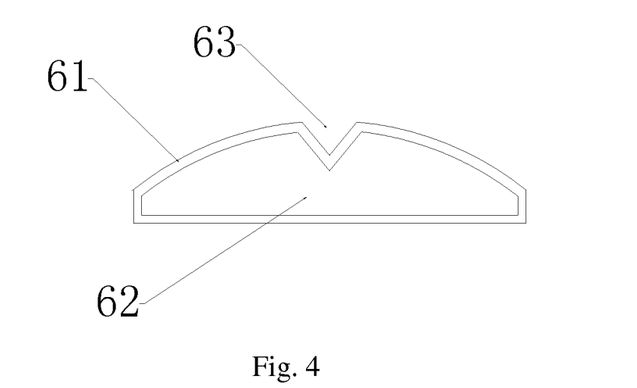
FIG. 4 is a schematic diagram of a second embodiment of a quantum dot lens according to the present application.

In order to increase the brightness around the quantum dot lens, and make the light emitting effect more uniform as a whole, a second embodiment of the quantum dot lens as shown in FIG. 4 is provided in this application. This embodiment is an improved variant based on the first embodiment. A conical diffusion hole 63 is defined inward from the center of the top of the hemispherical or semielliptical diffusion exit surface, and the diffusion hole 63 gradually expands from the interior of the lens body to the exterior. The diffusion hole 63 is configured to reflect the light incident into the middle of the diffusion surface to the edge of the diffusion surface, and thus the light emitting angle is increased, which makes the light emitting effect more uniform as a whole.

Figure 5:
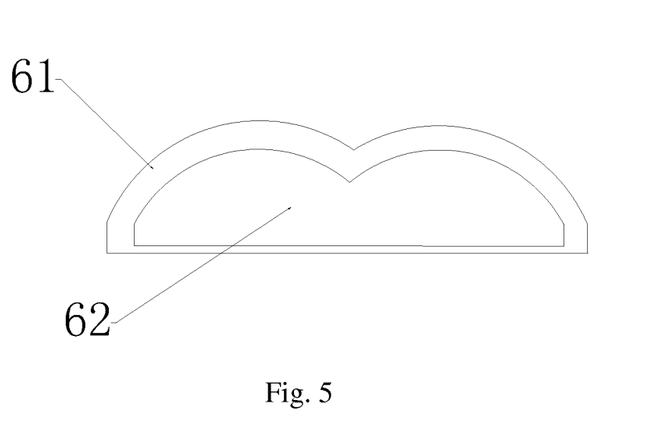
FIG. 5 is a schematic diagram of a third embodiment of a quantum dot lens according to the present application.

FIG. 5 is a third embodiment of the quantum dot lens according to the present application. The shape of the diffusion surface is also improved in this embodiment, in order to increase the brightness around the quantum dot lens and to make the light emitting effect more uniform as a whole. In the embodiment as shown in FIG. 5, the diffusion surface of the glass tube 61 is in the form of a bispherical butterfly; and the lights incident into the middle of the bispherical papilionaceous surface are mostly refracted to around the bispherical papilionaceous surface, which makes the light emitting effect more uniform as a whole.

Figure 6:
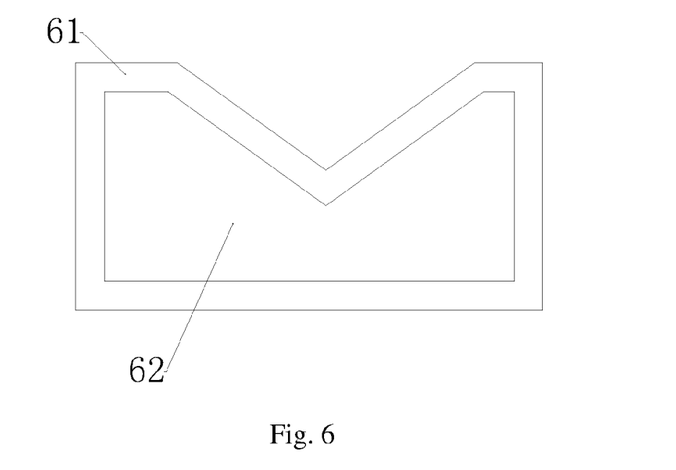
FIG. 6 is a schematic diagram of a fourth embodiment of a quantum dot lens according to the present application.

In the three embodiments mentioned above, the diffusion surface in each case is in the shape of an arc; however, the present application is not limited to this. FIG. 6 is a fourth embodiment of the quantum dot lens according to the present application. In this embodiment, the diffusion surface of the glass tube 61 is a plane, and a conical diffusion hole is defined in the center of the plane. The light incident into the diffusion hole is reflected to the edge of the diffusion surface, so that the light emitting effect is more uniform as a whole.

It should be understood for one skilled in the art that, the specific dimension of the quantum dot lens in each embodiment aforesaid can be adjusted based on the dimension of the LED, as long as the quantum dot lens can be firmly inserted into the top of the mixing cup 4. While the shape of the diffusion surface, such as the radius curvature of the hemispherical surface, the depth of the conical hole, and the tip angle of the conical hole, is chosen adaptively based on the angle to be diffused as required.

In the four embodiments aforesaid, the quantum dot rails filled into the glass tubes 61 can be formed in different shapes by changing the shapes of the glass tubes 61. In other embodiment of the present application, the same light diffusion effect can be achieved by carrying out treatment on the typical quantum dot rail in a cuboid shape.

Figure 7:
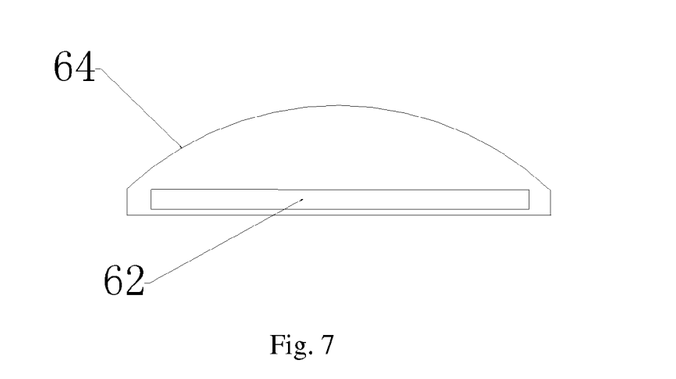
FIG. 7 is a schematic diagram of a fifth embodiment of a quantum dot lens according to the present application.

As shown in FIG. 7 is a fifth embodiment of the present application. In this embodiment, the quantum dot material to be used will be filled into the filling cavity 62 in a cuboid shape to form a quantum dot rail. The exterior of the quantum dot rail is encapsulated with a silicone layer 64, in this way, a lens body is formed. The bottom surface of the silicone layer 64 is a flat light incident surface, and the light exit surface is a diffusion exit surface in the form of a hemisphere or a semiellipse. Besides that, the quantum dot rail is located at the bottom of the quantum dot lens. Using the quantum dot lens according to the this embodiment, when the quantum dot lens is mounted onto the mixing cup 4, the light emitted from the LED firstly passes the flat incident surface at the bottom of the silicone layer 64, then the light is further incident into the quantum dot rail; with the excitation of the light emitted from LED, the quantum dot rail produces a excitation light of which the wavelength corresponds to the dimension of the quantum dot material; and then the excitation light passes the diffusion surface in the shape of a hemisphere or a semiellipse on the top of the silicone layer 64, and the light emitting angle is therefore increased.

Figure 8:
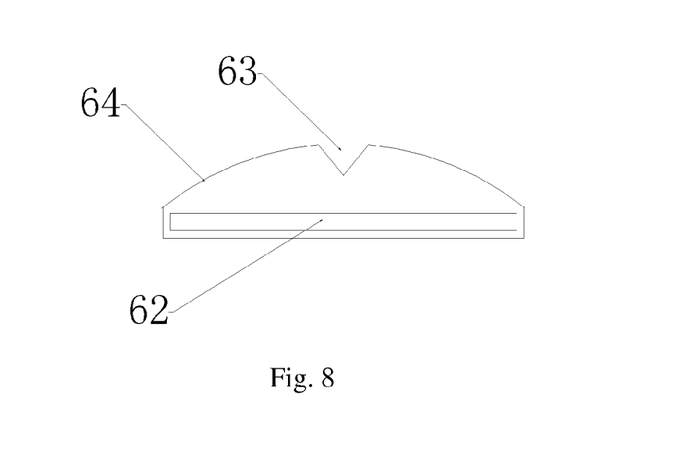
FIG. 8 is a schematic diagram of a sixth embodiment of a quantum dot lens according to the present application.

Corresponding to the second to the fourth embodiments of the present application, when using the silicone layer 64 to encapsulate the cubic quantum dot rail, a great number of methods can be used to increase the diffusion angle of the exiting light. For example, FIG. 8 is a sixth embodiment of the present application. This embodiment is an improved variant of the fifth embodiment. In this embodiment, a conical diffusion hole is defined in the center of the top of the hemispheric or a semielliptical diffusion surface. The excitation light emitted from the quantum dot rail may be reflected to the edge of the diffusion surface when it is incident into the conical diffusion hole in the middle, which makes the light emitting effect more uniform as a whole.

Figure 9:
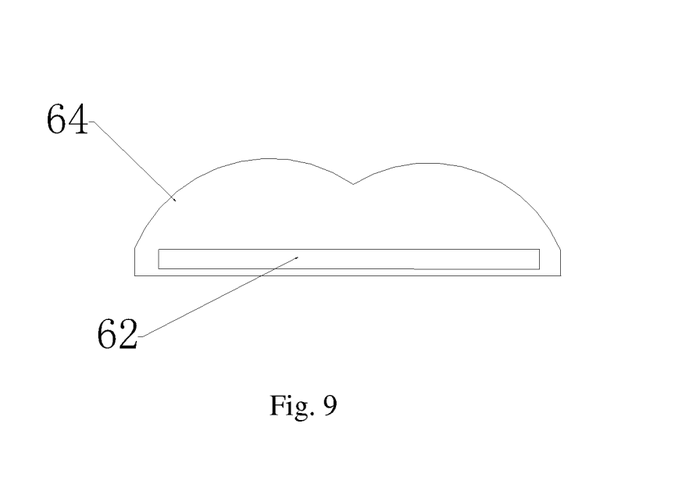
FIG. 9 is a schematic diagram of a seventh embodiment of a quantum dot lens according to the present application.

FIG. 9 is a seventh embodiment of the present application. In this embodiment, the light exit surface on the top of the silicone layer 64 is a surface in the shape of bispherical butterfly, and the light incident surface at the bottom is a smooth flat surface. The quantum dot rail inside the silicone layer 64 is located on one side close to the bottom of the silicone layer 64. In this way, the light emitted from the LED is incident into the silicone layer from the bottom, and then passes the quantum dot rail. The quantum dot rail is therefore excited, which produces a light matching with the dimension of the quantum dot material. Since the silicone has a high refraction rate between 1.45 to 1.55, if the light is exited from the surface in the shape of a bispherical butterfly, the light emitting angle thus can be increased. Furthermore, the light incident into the middle may be likely refracted around, which makes the light emitting effect more uniform.

Figure 10:
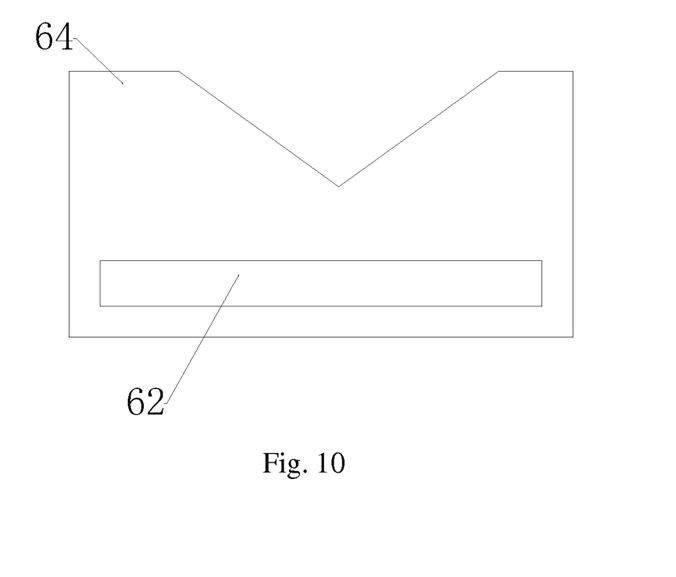
FIG. 10 is a schematic diagram of an eighth embodiment of a quantum dot lens according to the present application.

FIG. 10 is a eighth embodiment of the present application, the exit surface on the top of the silicone layer 64 is a plane with a conical diffusion hole, and the diffusion hole expands from the interior of the lens body to the exterior. When the light is incident onto the side wall of the conical hole that is located inside the silicone layer, the light may be total reflected as a result of the high refraction rate of the silicone, and then the light may be exited from two sides of the quantum dot lens, and the light emitted at large angle can be achieved.

Based on the shape and the structure of the quantum dot lens, there are a variety of manufacturing methods for manufacturing the quantum dot lens in each above-mentioned embodiment. About the first to the fourth embodiments of the present application, a glass tube 61 is used as an external shell. The manufacturing methods for the quantum dot lenses in these four embodiments are similar. Firstly, the mould is shaped, and a glass shell with a filling cavity 62 is formed within the shaped mould; in this case, the shape of the filling cavity 62 matches with the exterior shape of the glass shell. Then quantum dot materials are dissolved into solution, such as the methyl alcohol of which the refractive index is 1.328 or the hexane of which the refractive index is 1.375 to form a liquid form. After that, the mixed liquid is then filled into the filling cavity and a quantum dot lens is therefore formed. Wherein the bottom surface of the glass shell manufactured is a smooth plane; while the light exit surface, which corresponds to the first to the fourth embodiments, may be a surface in the shape of a hemisphere or a semi-ellipse, a hemisphere or a semi-ellipse with a conical hole, a bispherical papilionaceous surface or a bispherical papilionaceous surface with a conical hole.

Generally, when manufacturing the glass tube 61, the thickness of the glass may be controlled to be equal, the thickness of the bottom surface is equal everywhere or the thickness of the light exit surface is uniform everywhere, and thus it can be ensured that the light is emitted uniformly.

Figure 11:
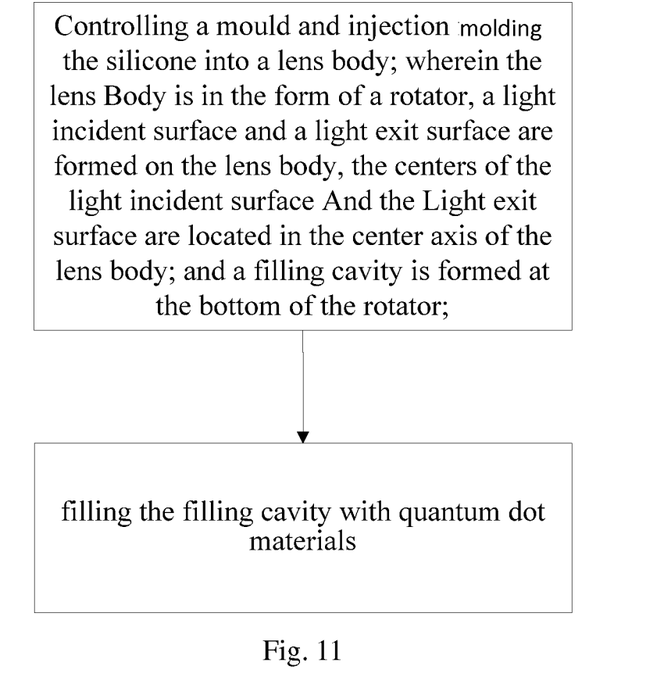
FIG. 11 is a flow chart of a first embodiment of a manufacturing method for a quantum dot lens according to the present application.

About the fifth to eighth embodiments, the quantum dot lenses in these embodiments have two different manufacturing methods. Take the fifth embodiment as an example; the first manufacturing method is shown in FIG. 11, firstly the mould is controlled, and a silicone layer 64 in the form of a rotator is formed by injection molding the silicone in the mould; the bottom surface of the rotator is a planar light incident surface, the light exit surface is a diffusion exit surface in the shape of a hemisphere or a semi-ellipse, and the bottom of the rotator forms a cubic filling cavity 62. After that, quantum dot materials are filled into the filling cavity 62 at the bottom of the rotator, and a quantum dot lens is therefore formed. That is, in this method, the exterior of the quantum dot lens is firstly injection molded, and the interior of the quantum dot lens has a cavity to be filled with the quantum dot materials, and finally the quantum dot lens is filled into the cavity.

Figure 12:
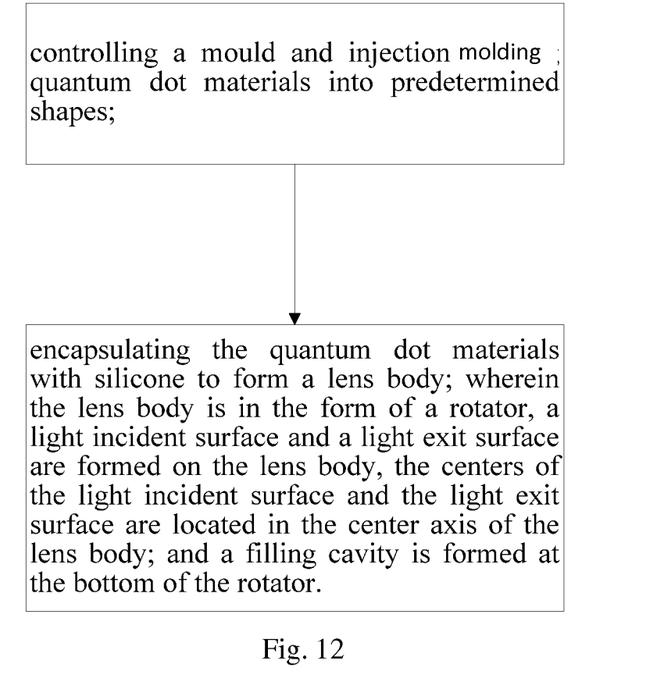
FIG. 12 is a flow chart of a second embodiment of a manufacturing method for a quantum dot lens according to the present application.

Another method is that, the quantum dot materials are firstly formed, and the exterior silicone layer is then manufactured. The detailed method is as shown in FIG. 12. Firstly, the mould is controlled, a cubic filling cavity 62 is formed in this mould, and the quantum dot materials are injection molded into a cube. The well prepared quantum dot materials are encapsulated by the silicone to form a silicone layer 64 in the form of a rotator; in this case, the bottom surface of the rotator is a planar light incident surface, and the light exit surface is a diffusion surface in the shape of a hemisphere or a semi-ellipse; besides that, the quantum dot materials are located on the bottom of the rotator.

The two methods mentioned above is not limited to manufacture the quantum dot lens with a diffusion surface in the shape of a hemisphere or a semi-ellipse; for the quantum dot lenses in the sixth to eighth embodiments, for example, the quantum dot lens with a diffusion surface in the shape of a hemisphere or a semi-ellipse with a conical diffusion hole therein, with a diffusion surface in the shape of a bispherical butterfly, or with a diffusion surface in the shape of a plane with a conical diffusion hole can also be manufactured by these two methods. The difference only lies in that the control methods for the mould configured to form the diffusion exit surface is various.

A variety of shapes of the diffusion exit surfaces are provided in the embodiments aforesaid, to increase the light emitting angle, which makes the light emitting more uniform, preventing the light emitting brightness in the middle from being too high. One skilled in the art can carry out general alternative designs based on the optical theory.

Those mentioned above are the detailed descriptions of the embodiments. However, the present invention is not limited to the above embodiments. various changes may be made and equivalents may be substituted without departing from the scope of the present invention. However, all the changes will be included within the scope of the appended claims.

What is claimed is:

1. A quantum dot lens, comprising a lens body in the shape of a rotator, a light incident surface and a light exit surface are formed on the lens body, the centers of the light incident surface and the light exit surface are located in the center axis of the lens body; quantum dot materials are filled inside the lens body; the lens body includes an encapsulating tube made from glass; a filling cavity is formed inside the encapsulating tube, wherein the shape of the filling cavity matches with the shape of the rotator; the quantum dot materials are filled into the filling cavity; a bottom surface of the encapsulating tube is a plane; a thickness of the glass of the bottom surface is equal everywhere; a thickness of the light exit surface of the encapsulating tube is uniform everywhere; and the light exit surface of the encapsulating tube is in the shape of a hemisphere or a semi-ellipse, a hemisphere or a semi-ellipse with a conical hole, a bispherical papilionaceous surface or a bispherical papilionaceous surface with a conical hole.

2. The quantum dot lens according to claim 1, wherein a conical diffusion hole is defined in the lens body; the diffusion hole is located in the center of the light exit surface, and is configured to increase the light emitting angle; the diameter of the diffusion hole expands gradually from the interior of the lens body to the exterior.

3. The quantum dot lens according to claim 1, wherein the light exit surface is in the shape of a bispherical butterfly.

4. The quantum dot lens according to claim 1, wherein the quantum dot materials filled in the filling cavity are semiconductor materials; the refractive index of the semiconductor materials is 2.45.

* * * * *